United States Patent [19]
Moore

[11] 3,760,680
[45] Sept. 25, 1973

[54] DEVICE FOR TEACHING TIME AND RHYTHM
[76] Inventor: Philip D. Moore, 6726 Pacific, Huntington Beach, Calif.
[22] Filed: Nov. 19, 1971
[21] Appl. No.: 200,383

[52] U.S. Cl. .................................. 84/483, 84/484
[51] Int. Cl. ......................................... G10b 15/00
[58] Field of Search................... 84/470, 477, 478, 84/487, 484, 129

[56] References Cited
UNITED STATES PATENTS
2,619,868  12/1952  Moore et al. ........................ 84/484
1,433,307  10/1922  Smith .................................. 84/129

Primary Examiner—Richard B. Wilkinson
Assistant Examiner—Lawrence R. Franklin
Attorney—Charles G. Lyon et al.

[57] ABSTRACT

A device for teaching time and rhythm in music incorporates an endless chain on which pointers cooperating with sheet music are mounted for both horizontal and vertical movement. During horizontal movement, the speed of which may be adjusted by positioning of the frame of a driving motor, the pointer is caused to bob up and down in accordance with the desired beat of the music. The time interval between bobs of the pointer is adjustable by positioning alternate series of pins in the path of movement of a cam which serves to a raise the pointer on contact with one of such pins.

2 Claims, 7 Drawing Figures

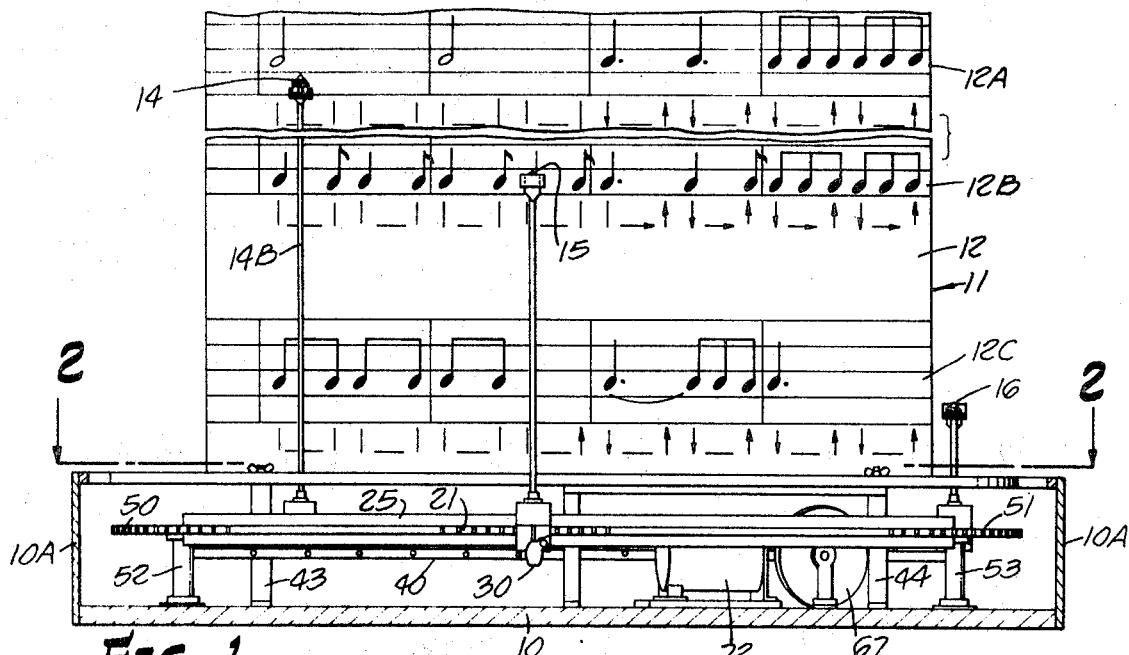
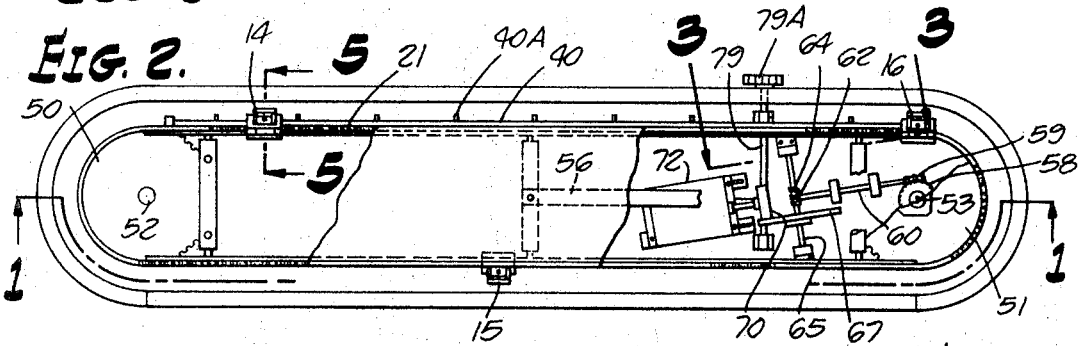
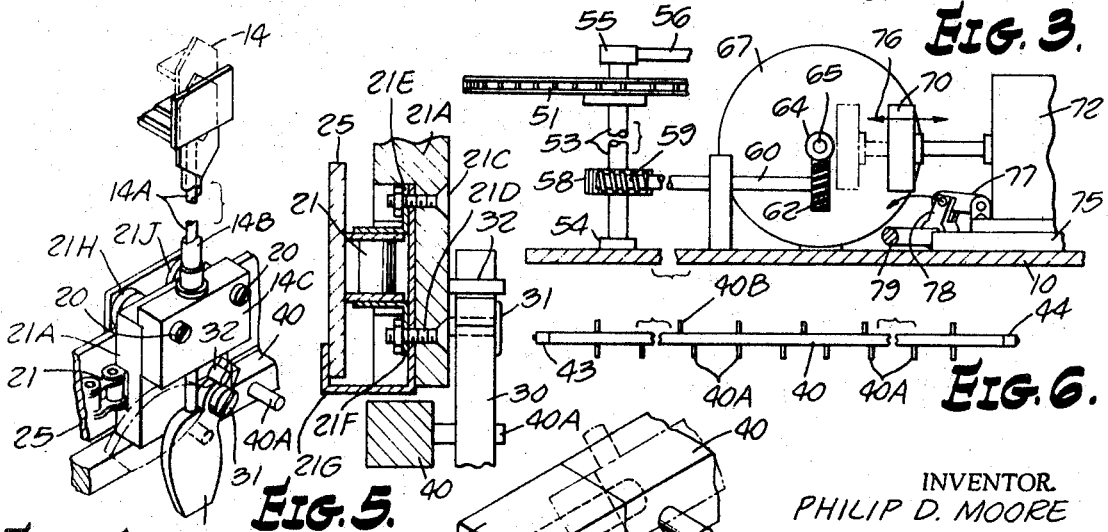
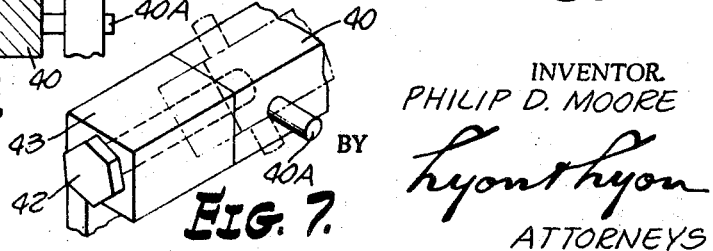
INVENTOR.
PHILIP D. MOORE

DEVICE FOR TEACHING TIME AND RHYTHM

The present invention relates to apparatus for teaching rhythm and timing in the study of music and involves improvements in that type of apparatus disclosed in U.S. Pat. No. 2,619,868 issued Dec. 2, 1952.

It is an object of the present invention to provide an apparatus of this character which is flexible in providing an adjustment not only in timing but also in rhythm with such adjustments being independent of each other.

A specific object of the present invention is to provide an improved machine featured by novel constructions that provide also a timing adjustment.

Another specific object of the present invention is to provide an improved machine featured by novel constructions that provide also an adjustment of rhythm.

The features of the present invention which are believed to be novel are set forth with particularity in the appended claims.

This invention itself, both as to its organization and manner of operation, together with further objects and advantages thereof, may be best understood by reference to the following description taken in connection with the accompanying drawings in which:

FIG. 1 is a view in section of apparatus embodying features of the present invention mounted in relation to a board having sheet music in enlarged form pasted thereon, the section being substantially as indicated by line 1—1 in FIG. 2.

FIG. 2 is a view taken as indicated by line 2—2 in FIG. 1.

FIG. 3 is a view taken as indicated by line 3—3 in FIG. 2.

FIG. 4 is a perspective view illustrating features of mechanism whereby the music pointer is caused to bob with respect to music notes.

FIG. 5 is a section taken substantially on line 5—5 of FIG. 2.

FIG. 6 illustrates the nature of the adjustable bar pivoted at each of its ends for changing the tempo of the music beats.

FIG. 7 is a perspective view illustrating the manner in which the adjustable bar of FIG. 6 is pivoted.

The apparatus is portable and is mounted on a base 10 from which along its periphery upwardly extending walls 10A may extend for housing the apparatus. This base 10 may rest on a table (not shown) on which also rests the large cardboard 11 having the sheet music 12 mounted thereon in aligned relationship with a series of three pointers 14, 15 and 16 which are caused to scan corresponding lines 12A, 12B, 12C of the music printed on sheet 12.

One of the characteristic features of the present invention is that these pointers 14, 15 and 16 may be caused to bob, i.e. move vertically simultaneously as they scan the printed music, i.e. move horizontally with such bobbing movement occurring at one of two selected rates or tempos.

Each of these pointers 14, 15 and 16 are mounted as shown in FIG. 4 on a vertical rod (corresponding to rod 14A) which is slidably mounted in the vertically extending tube (corresponding to tube 14B), the lower end of such tube being affixed to a corresponding traveling plate (corresponding to plate 14C) and each of such plates for each pointer is affixed by bolts 20 to a metal supporting block 21A mounted on endless chain 21 at space intervals therealong.

Each supporting block 21A is affixed to the chain as seen in FIG. 5 wherein a pair of screws 21C, 21D is used to secure the block 21A to angle brackets 21E, 21F secured to the chain as, for example, by welding, with a modified U-shaped plate 21G sandwiched therebetween. This plate 21G extends around a stationary guide bar 25 or strip for stability and guiding. Also the block 21A has a pair of rollers 21H, 21J and a guide plate 21K mounted thereon for cooperative guiding engagement with the upper portion of stationary plate 25.

The support block 21A also pivotally mounts an actuating cam 30 which pivots about the axis of its retaining screw 31 threaded in block 21A. A stop pin 32 extending from block 21A cooperates with an extension of the cam 30 to limit its downward counterclockwise movement in FIG. 4.

The cam 30 during horizontal movement of chain 21 with which it travels periodically engages in succession a series of pins 40A extending from one side of an adjustable bar 40. Bar 40 while normally stationary in operation is pivotally mounted in the path of movement of cam 30 either by the previously mentioned series of pins 40A or the other series of pins 40B which extend from the opposite side of bar 40. It will be seen in FIG. 6 that the pins in a particular series are equally spaced but the series 40A includes twice as many pins to impart an additional beat or double beat or bob of 14, 15, 16 in the music being scanned.

For obtaining this adjustment, the bar 40 is pivotable about its longitudinal axis at each of its ends and about the axis of each of the retaining pins 42 threaded in corresponding one of the two stationary end brackets 43, 44. There is sufficient friction at the ends of bar 40 to secure the adjustment.

The chain 21 passes over a pair of sprocket wheels 50, 51. Sprocket wheel 50 rotates on stationary post 52 and wheel 51 is affixed to a shaft 53 (FIG. 3) which has its ends rotatably supported in bearings 54, 55, the bearing 55 being on the end of a stationary arm 56. This shaft 53 mounts a gear 58 which is in mesh with a gear 59 on one end of rotatable shaft 60 having a gear 62 on its other end meshing with a worm gear 64 on a rotatable shaft 65 on which is also mounted a disc 67. This disc 67 is frictionally engaged by a drive roller 70 on the output shaft of motor 72. The motor 72 is adjustably positioned along its axis to increase or decrease the speed of disc 67 and hence the speed at which the pointers 14, 15, 16 move horizontally. For this latter purpose the frame of motor 72 is slidably mounted in a track structure 75 and is connected by a link 77 to a crank 78 on shaft 79 so that manual rotation of shaft 79 as, for example, by knob 79A, causes the driving roller 70 to move in the direction indicated by arrows 76 to correspondingly cause the roller 70 to move closer or further from the axis of rotation of disc 67 to change horizontal speed of the pointers 14, 15, 16.

Thus means are provided for adjusting not only the speed at which music is to be played but also means are provided for either single beat or double beat.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. In a device of the character described, an indicator, means moving said indicator along substantially a horizontal line adjacent lines of printed music to scan the same, and means actuated upon operation of the first mentioned means for imparting an up and down generally vertical movement to said indicator while being moved along said horizontal line, the last mentioned means cooperating with an elongated bar, means pivotally supporting said bar near opposite ends thereof for pivotal movement about the axis of said bar, and a first and a second series of pins on said bar and extending therefrom in opposite directions, one series of which may be selectively positioned by pivoting said bar about its axis to operate the last mentioned means recurrently when and as said last mentioned means is being moved by said moving means, and friction means acting on at least one end of said bar to maintain either one of said series of pins in the path of movement of said imparting means.

2. A device as set forth in claim 1 in which said moving means includes a motor with a stationary frame and an output shaft, a supporting structure, means slidably mounting said frame on said supporting structure for adjustably positioning the frame, a friction pulley mounted on said shaft, a disc engaging said pulley for moving said indicator, said friction pulley engaging said disc at different distances from its rotational axis depending upon the position of said frame in its supporting structure to change the speed at which said indicator is moved along said horizontal line.

* * * * *